(12) United States Patent
Berry et al.

(10) Patent No.: US 12,553,611 B1
(45) Date of Patent: Feb. 17, 2026

(54) HYDROGEN CAPABLE FUEL INJECTOR ASSEMBLY

(71) Applicant: GE Vernova Infrastructure Technology LLC, Greenville, SC (US)

(72) Inventors: Jonathan Dwight Berry, Simpsonville, SC (US); Justin Mark Bailey, Greenville, SC (US); George Andrew Gergely, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/971,639

(22) Filed: Dec. 6, 2024

(51) Int. Cl.
*F23R 3/28* (2006.01)
*F23R 3/34* (2006.01)

(52) U.S. Cl.
CPC .............. *F23R 3/286* (2013.01); *F23R 3/346* (2013.01); *F23R 2900/00002* (2013.01)

(58) Field of Classification Search
CPC ................................. F23R 3/286; F23R 3/346
See application file for complete search history.

(56) References Cited

U.S. PATENT DOCUMENTS

| | | | |
|---|---|---|---|
| 8,752,386 B2 | 6/2014 | Fox et al. | |
| 9,366,443 B2 | 6/2016 | Laster et al. | |
| 10,184,666 B2 | 1/2019 | Meadows et al. | |
| 10,465,909 B2 | 11/2019 | Boardman et al. | |
| 11,454,396 B1* | 9/2022 | Boardman | F23R 3/16 |
| 11,566,790 B1 | 1/2023 | Hughes et al. | |
| 2023/0266009 A1* | 8/2023 | Naik | F23R 3/286 60/737 |

\* cited by examiner

*Primary Examiner* — Andrew H Nguyen
(74) *Attorney, Agent, or Firm* — Dority & Manning, P.A.

(57) ABSTRACT

A fuel injection assembly for a gas turbine engine includes a housing having a first housing portion adjacent a first end and a second housing portion adjacent a second end opposite the first end. The first housing portion defines at least one fuel chamber, and the second housing portion defines at least one mixing chamber. The fuel injection assembly includes fuel channels extending along a central axis between the first housing portion and the second housing portion. The fuel channels are spaced apart along a length of the housing and are in fluid communication with the at least one fuel chamber and the at least one mixing chamber. Fluid channels are disposed in the second housing portion and in fluid communication with the at least one mixing chamber to promote mixing of fuel and air. A combustor having the fuel injection assembly is also provided.

19 Claims, 8 Drawing Sheets

HYDROGEN CAPABLE FUEL INJECTOR ASSEMBLY

FEDERALLY SPONSORED RESEARCH

This invention was made with government support under contract number DE-FE0032173 awarded by the Department of Energy. The U.S. government may have certain rights in the invention.

FIELD

The present disclosure relates generally to fuel injector assemblies for gas turbine combustors.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine engine via the exhaust section.

In some combustors, the generation of combustion gases occurs at two or more axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone.

Traditional gas turbine engines include one or more combustors that burn a mixture of natural gas and air within the combustion chamber to generate the high pressure and temperature combustion gases. As a byproduct, oxides of nitrogen (NOx), carbon dioxide ($CO_2$), and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Burning a blend of natural gas and high amounts of hydrogen and/or burning pure hydrogen instead of natural gas within the combustor would significantly reduce or eliminate the emission of $CO_2$. However, because hydrogen burning characteristics are different than those of natural gas, traditional combustion systems, including traditional AFS fuel injectors, are not capable of burning high levels of hydrogen and/or pure hydrogen without issue. For example, burning high levels of hydrogen and/or pure hydrogen within a traditional combustion system could promote flashback or flame holding conditions in which the combustion flame migrates towards the fuel being supplied by the injector, possibly causing severe damage to the injector in a relatively short amount of time.

As such, a fuel injector capable of delivering alternative fuels (such as hydrogen) and air to a secondary combustion zone, without causing flame holding or flashback issues, is desired in the art.

BRIEF DESCRIPTION

Aspects and advantages of the fuel injection assemblies in accordance with the present disclosure will be set forth in part in the following description, or may be obvious from the description, or may be learned through practice of the technology.

In accordance with one embodiment, a fuel injection assembly for a combustor of a gas turbine engine is provided. The fuel injection assembly includes a housing extending between a first end and a second end opposite the first end. The housing includes a first housing portion adjacent the first end and a second housing portion adjacent the second end. The first housing portion defines at least one fuel chamber, and the second housing portion defines at least one mixing chamber. The fuel injection assembly includes a plurality of fuel channels extending along a central axis between the first housing portion and the second housing portion. The plurality of fuel channels is in fluid communication with the at least one fuel chamber and the at least one mixing chamber. The plurality of fuel channels is spaced apart along a length of the housing. The fuel injection assembly also includes a first plurality of fluid channels disposed in the second housing portion and in fluid communication with the at least one mixing chamber and a second plurality of fluid channels disposed in the second housing portion and in fluid communication with the at least one mixing chamber. The first plurality of fluid channels is spaced from the plurality of fuel channels, and the second plurality of fluid channels is spaced from the first plurality of fluid channels.

In accordance with another embodiment, a combustor is provided. The combustor includes a combustion liner extending in a downstream direction and defining a combustion chamber, an outer sleeve spaced apart from and surrounding the combustion liner such that an annulus is defined between the outer sleeve and the combustion liner, and a fuel injection assembly coupled to the outer sleeve and in fluid communication with a fuel source. The fuel injection assembly includes a housing extending between a first end and a second end opposite the first end. The housing includes a first housing portion adjacent the first end and a second housing portion adjacent the second end. The first housing portion defines at least one fuel chamber, and the second housing portion defines at least one mixing chamber. The fuel injection assembly includes a plurality of fuel channels extending along a central axis between the first housing portion and the second housing portion. The plurality of fuel channels is in fluid communication with the at least one fuel chamber and the at least one mixing chamber. The plurality of fuel channels is spaced apart along a length of the housing. The fuel injection assembly also includes a first plurality of fluid channels disposed in the second housing portion and in fluid communication with the at least one mixing chamber and a second plurality of fluid channels disposed in the second housing portion and in fluid communication with the at least one mixing chamber. The first plurality of fluid channels is spaced from the plurality of fuel channels, and the second plurality of fluid channels is spaced from the first plurality of fluid channels.

These and other features, aspects, and advantages of the present fuel injection assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present fuel injection assemblies, including the best mode of making and using the present systems and methods, directed to one of ordinary skill in the art, is set forth in the specification, which makes reference to the appended figures, in which.

DETAILED DESCRIPTION

Figure 1:
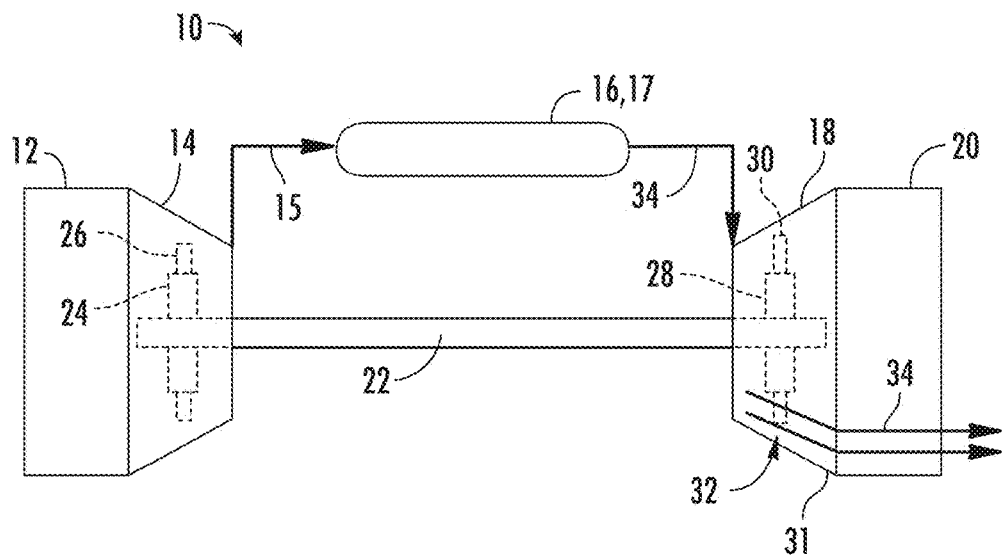
FIG. 1 is a schematic illustration of a turbomachine, in accordance with embodiments of the present disclosure.

Reference now will be made in detail to embodiments of the present fuel injector and fuel injection assembly, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the subject technology. As used herein, the terms "first," "second," and "third" may be used interchangeably to distinguish one component from another and are not intended to signify location or importance of the individual components.

The term "fluid" may refer to a gas or a liquid. The term "fluid communication" means that a fluid is capable of flowing or being conveyed between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values. When used in the context of an angle or direction, such terms include within five degrees greater or less than the stated angle or direction. For example, "generally vertical" includes directions within five degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like indicate that a first component is joined to a second component with no intervening structures. As used herein, the terms "comprises," "comprising," "includes," "including," "has," "having" or any other variations thereof, are intended to cover a non-exclusive inclusion. For example, a process, method, article, or apparatus that comprises a list of features is not necessarily limited only to those features but may include other features not expressly listed or inherent to such process, method, article, or apparatus.

Here and throughout the specification and claims, range limitations are identified and include all the sub-ranges contained therein unless context or language indicates otherwise. For example, all ranges disclosed herein are inclusive of the endpoints, and the endpoints are independently combinable with each other.

As used herein, the term "premix" may be used to describe a component, passage, or cavity upstream of a respective combustion zone within which mixing of two (or more) fluids occurs. For example, "premix" may be used to describe a component, passage, or cavity in which two fluids (such as fuel and air) are mixed together prior to being ejected from such component, passage, or cavity (e.g., into a combustion zone).

Referring now to the drawings, FIG. 1 illustrates a schematic diagram of an exemplary embodiment of a turbomachine, which in the illustrated embodiment is a gas turbine engine 10. Although an industrial or land-based gas turbine is shown and described herein, the present disclosure is not limited to an industrial or land-based gas turbine engine unless otherwise specified in the claims. For example, the technology as described herein may be used in any type of turbomachine including but not limited to a steam turbine, an aircraft gas turbine, or a marine gas turbine.

As shown, the gas turbine engine 10 generally includes an inlet section 12, a compressor section 14 disposed downstream of the inlet section 12, a plurality of combustors 17 (shown in FIG. 2) within a combustion section 16 disposed downstream of the compressor section 14, a turbine section 18 disposed downstream of the combustion section 16, and an exhaust section 20 disposed downstream of the turbine section 18. Additionally, the gas turbine engine 10 may include one or more shafts 22 coupled between the compressor section 14 and the turbine section 18. The shaft 22 may be coupled to a generator, not shown, for producing electricity.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form an upstream portion of the shaft 22 that extends through the compressor section 14. The compressor section 14 further includes a plurality of stationary vanes (not shown), which are arranged in stages with the rotor blades 26 and which direct the flow against the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a downstream portion of the shaft 22 that extends through the turbine section 18. The turbine section 18 further includes an outer casing 31 that circumferentially surrounds the downstream portion of the shaft 22 and the rotor blades 30, thereby at least partially defining a hot gas path 32 through the turbine section 18. The turbine section 18 further includes a plurality of stationary vanes (not shown), which are arranged in stages with the rotor blades 30 and which direct the flow against the rotor blades 30.

During operation, a working fluid such as air flows through the inlet section 12 and into the compressor section 14 where the air is progressively compressed by multiple compressor stages of rotating blades 26 and stationary vanes, thus providing compressed air 15 to the combustors 17 of the combustion section 16. The compressed air 15 is mixed with fuel and burned within each combustor 17 to produce combustion gases 34. The combustion gases 34 flow through the hot gas path 32 from the combustion section 16 into the turbine section 18, in which energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

Figure 2:
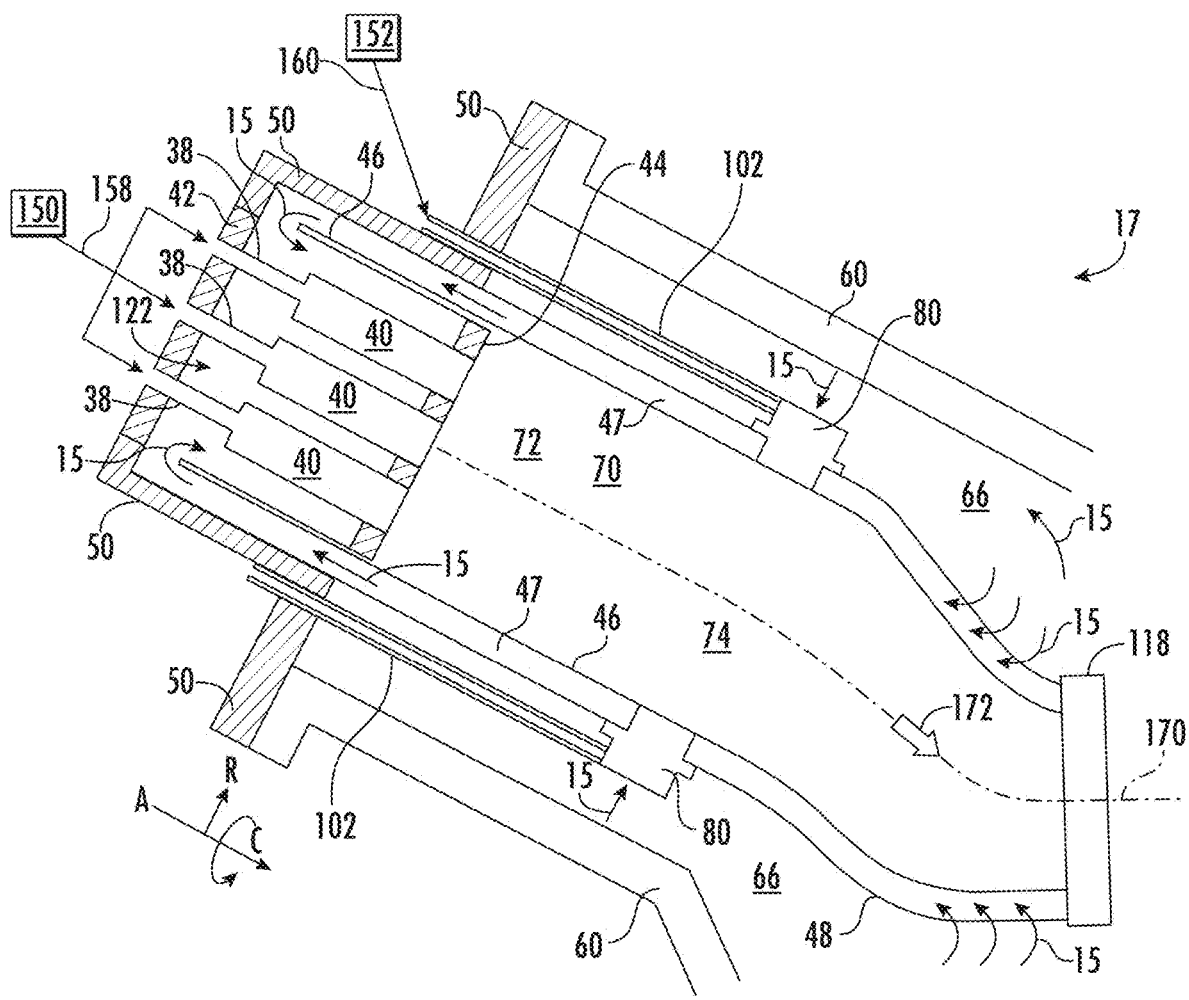
FIG. 2 is a schematic view of a combustor as may be employed in the turbomachine of FIG. 1, in accordance with embodiments of the present disclosure.

FIG. 2 is a schematic representation of the combustor 17 as may be included in the combustion section 16 of the gas turbine engine 10. The combustion section 16 may be a can annular combustion system. In a can annular combustion system, a plurality of combustors 17 (e.g., 8, 10, 12, 14, 16, or more) are positioned in an annular array about the shaft 22.

As shown in FIG. 2, the combustor 17 may define a cylindrical coordinate system. The cylindrical coordinate system may define an axial direction A (e.g. a downstream direction) substantially parallel to and/or along an axial centerline 170 of the combustor 17, a radial direction R perpendicular to the axial centerline 170, and a circumferential direction C extending around the axial centerline 170.

The combustor 17 includes a combustion liner 46 that defines a combustion chamber 70 within which combustion occurs. The combustion liner 46 may be positioned within (i.e., circumferentially surrounded by) an outer sleeve 48, such that an annulus 47 is formed therebetween. The combustion liner 46 may contain and convey combustion gases to the turbine section 18. As shown in FIG. 2, the combustion liner 46 may extend between at least one fuel nozzle 40 and an aft frame 118. The combustion liner 46 may have a generally cylindrical liner portion and a tapered transition portion that is separate from the generally cylindrical liner portion, as in many conventional combustion systems. Alternately, the combustion liner 46 may have a unified body (or "unibody") construction, in which the generally cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 18 are integrated into a single unit (without aft frame 118), sometimes referred to as a "transition nozzle" or an "integrated exit piece."

FIG. 2 illustrates a combustor 17 having both the at least one fuel nozzle 40 and a fuel injection assembly 80 (also referred to as an axial fuel staging ("AFS") system), as discussed further herein. The at least one fuel nozzle 40 may be positioned at the forward end of the combustor 17. Fuel may be directed through fuel supply conduits 38, which extend through an end cover 42, and into the at least one fuel nozzle 40. The at least one fuel nozzle 40 convey the fuel and compressed air 15 into a primary combustion zone 72, where combustion occurs. In some embodiments, the fuel and compressed air 15 are combined as a mixture prior to reaching the primary combustion zone 72 (i.e., are "premixed").

The combustion liner 46 may be surrounded by an outer sleeve 48, which is spaced radially outward of the combustion liner 46 to define an annulus 47 through which compressed air 15 flows to a head end of the combustor 17. For example, compressed air 15 may enter the annulus 47 through the outer sleeve 48 (e.g., through impingement holes proximate the aft frame 118) and travel towards the end cover 42, such that the compressed air 15 within the annulus 47 flows opposite the direction of combustion gases 172 (34 in FIG. 1) within the combustion liner 46. Heat is transferred convectively from the combustion liner 46 to the compressed air 15, thus cooling the combustion liner 46 and warming the compressed air 15.

In some exemplary embodiments, the outer sleeve 48 may include a flow sleeve and an impingement sleeve coupled to one another. The flow sleeve may be disposed at the forward end, and the impingement sleeve may be disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The forward casing 50 and the end cover 42 of the combustor 17 define the head end air plenum 122, which includes the at least one fuel nozzle 40. The at least one fuel nozzle 40 may be any type of fuel nozzle, such as bundled tube fuel nozzles or swirler nozzles (often referred to as "swozzles"). The at least one fuel nozzle 40 may be positioned within the head end air plenum 122 defined at least partially by the forward casing 50. In many embodiments, the at least one fuel nozzle 40 may extend from the end cover 42. For example, each of the at least one fuel nozzle 40 may be coupled to an aft surface of the end cover 42 via a flange (not shown). As shown in FIG. 2, the at least one fuel nozzle 40 may be partially surrounded by the combustion liner 46. The aft, or downstream ends, of the at least one fuel nozzle 40 extend through or collectively define a cap plate 44 that defines the upstream end of the combustion chamber 70.

The at least one fuel nozzle 40 may be in fluid communication with a first fuel source, such as a first fuel supply 150, configured to supply a first fuel 158 to the at least one fuel nozzle 40. In many embodiments, the first fuel 158 may be a fuel mixture containing natural gas (such as one or more of methane, ethane, propane, or other suitable natural gas) and hydrogen. In some embodiments, the hydrogen may be a majority component (e.g., more than 50%) of the fuel mixture. In other embodiments, the first fuel 158 may be pure natural gas or pure hydrogen (e.g., 100% hydrogen, which may or may not contain some trace amount of contaminants), such that the first fuel is not a mixture of multiple fuels. In exemplary embodiments, the first fuel 158 and compressed air 15 may mix together within the at least one fuel nozzle 40 to form a first mixture of compressed air 15 and the first fuel 158 before being ejected (or injected) by the at least one fuel nozzle 40 into the primary combustion zone 72.

The forward casing 50 may be fluidly and mechanically connected to a compressor discharge casing 60, which defines a high-pressure plenum 66 around the combustion liner 46 and the outer sleeve 48. Compressed air 15 from the compressor section 14 travels through the high-pressure plenum 66 and enters the combustor 17 via apertures (not shown) in the downstream end of the outer sleeve 48 (as indicated by arrows near the aft frame 118). Compressed air travels upstream through the annulus 47 and is turned by the end cover 42 to enter the at least one fuel nozzle 40 and to cool the head end. In particular, compressed air 15 flows from high-pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the at least one fuel nozzle 40.

In the exemplary embodiment shown in FIG. 2, the fuel injection assembly 80 is provided to deliver a second fuel/air mixture to a secondary combustion zone 74 downstream from the primary combustion zone 72. For example, a second flow of fuel and air may be introduced by the fuel injection assembly 80 to the secondary combustion zone 74.

The primary combustion zone 72 and the secondary combustion zone 74 may each be portions of the combustion chamber 70 and therefore may be defined by the combustion liner 46. For example, the primary combustion zone 72 may be defined from an outlet of the at least one fuel nozzle 40 to the fuel injection assembly 80, and the secondary combustion zone 74 may be defined from the fuel injection assembly 80 to the aft frame 118. In this arrangement, the forwardmost boundary of the fuel injection assembly 80 may define the end of the primary combustion zone 72 and the beginning of the secondary combustion zone 74 (e.g., at an axial location where a second flow of fuel and air are introduced).

Such a combustion system having axially separated combustion zones is described herein as an axial fuel staging ("AFS") system. The fuel injection assemblies 80 may be circumferentially spaced apart from one another on the outer sleeve 48 (e.g., equally spaced apart in some embodiments). In some example embodiments, the combustor 17 may include four fuel injection assemblies 80 circumferentially spaced apart from one another and configured to inject a second mixture of fuel and air into a secondary combustion zone 74 via the fuel injection assembly 80. In other example embodiments, the combustor 17 may include any number of fuel injection assemblies 80 (e.g., 1, 2, 3, or up to 10).

As shown in FIG. 2, each fuel injection assembly 80 may be coupled to the outer sleeve 48. For example, each fuel injection assembly 80 may couple to a radial outer surface of the outer sleeve 48 and extend radially through the annulus 47 between the outer sleeve 48 and the combustion liner 46. In this instance, the radial direction is defined relative to the axial centerline 170 of the combustor 17.

A fuel supply conduit 102 may fluidly couple to each respective fuel injection assembly 80. The fuel injection assembly 80 may be in fluid communication with a fuel source, such as a second fuel supply 152, configured to supply a second fuel 160 to the fuel injection assembly 80 via the fuel supply conduit 102. The second fuel supply 152 may be the same as or different from the first fuel supply 150, such that the fuel injection assembly 80 may be supplied with the same fuel or a different fuel than the at least one fuel nozzle 40. In many embodiments, the second fuel 160 may be a fuel mixture containing natural gas (such as one or more of methane, ethane, propane, or other suitable natural gas) and hydrogen. In some embodiments, the hydrogen may be a majority component (e.g., more than 50%) of the fuel mixture. In other embodiments, the second fuel 160 may be pure natural gas or pure hydrogen (e.g., 100% hydrogen, which may or may not contain some trace amount of contaminants), such that the first fuel is not a mixture of multiple fuels. In exemplary embodiments, the second fuel 160 and compressed air 15 may mix together within the fuel injection assembly 80 to form a mixture of compressed air 15 and the second fuel 160 before being injected into the secondary combustion zone 74.

Figure 3:
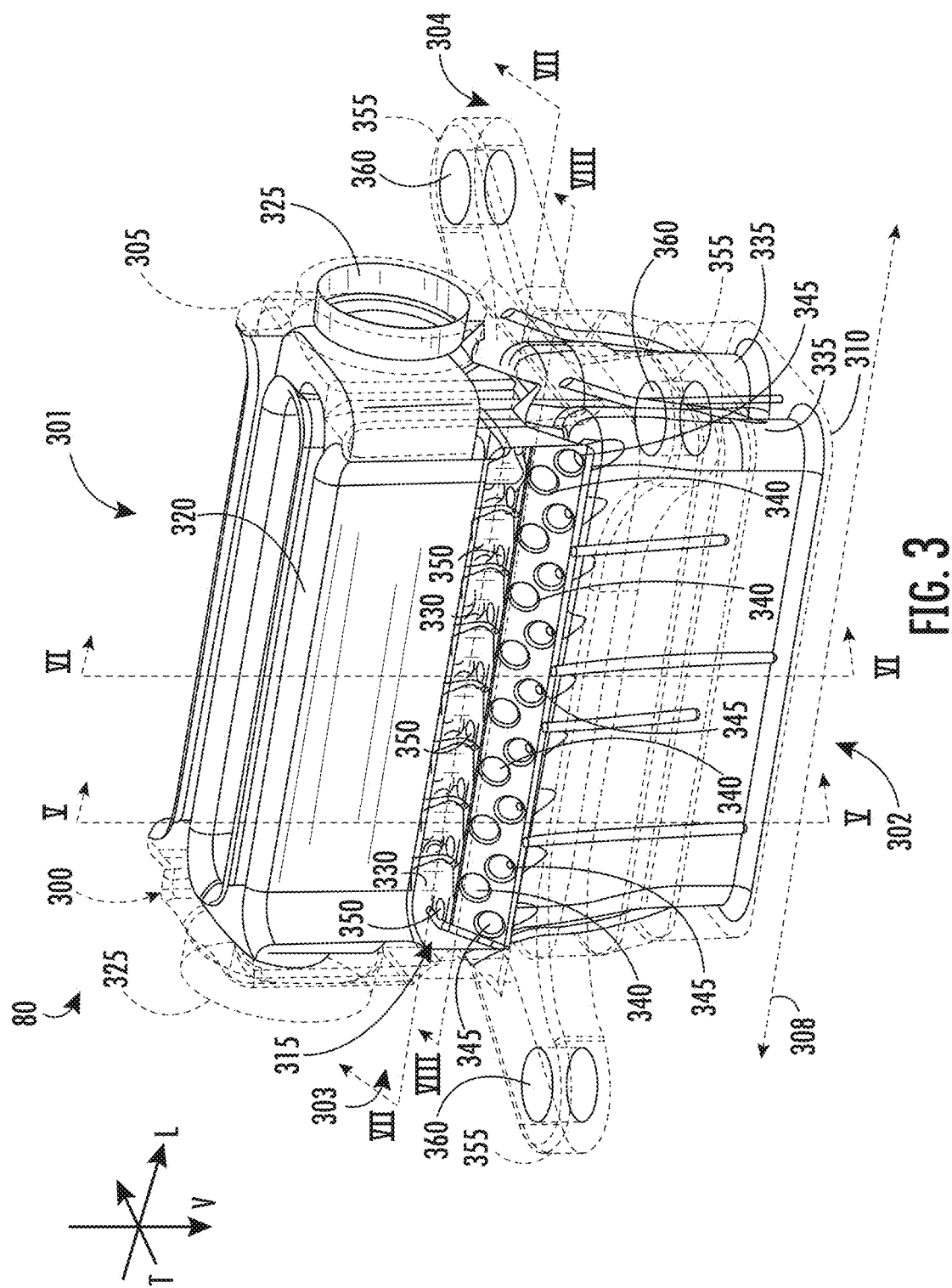
FIG. 3 is a perspective view of a fuel injection assembly as may be employed in the combustor of FIG. 2, in accordance with embodiments of the present disclosure.

FIG. 3 illustrates a perspective view of the fuel injection assembly 80 as may be employed in the combustor 17 of FIG. 2, in accordance with embodiments of the present disclosure. For clarity, some features are shown in phantom lines.

The fuel injection assembly 80 includes a housing 300 extending between a first end 301 and a second end 302 opposite the first end 301. As shown and described herein, the first end 301 is an air inlet end of the fuel injection assembly 80, and the second end 302 is an outlet end of the fuel injection assembly 80. An injection axis of the fuel injection assembly 80 (e.g., center axis 510 of FIG. 5) that extends between the first end 301 and the second end 302 defines the axial or vertical direction of the fuel injection assembly 80, the vertical ("V") direction being generally parallel to a radial direction of the combustor 17. The housing 300 may also be elongated such that the housing 300 extends along a longitudinal axis 308 between a third end 303 and a fourth end 304 of the housing 300. The housing 300 may have a greater length in the longitudinal ("L") direction than width in the transverse ("T") direction, where the longitudinal and transverse directions are perpendicular to one another and to the vertical ("V") direction. In the legend in FIG. 3, the arrow for the vertical direction is pointed downward to represent the direction of the injection of the flow from the fuel injection assembly 80. See also FIG. 8A, which shows vertical axis 802.

The housing 300 includes a first housing portion 305 adjacent the first end 301 and a second housing portion 310 adjacent the second end 302. The first housing portion 305 may define at least one fuel chamber 320. The at least one fuel chamber 320 may extend along the longitudinal axis 308 between the third end 303 and the fourth end 304.

The at least one fuel chamber 320 may be configured to be in fluid communication with a fuel source, such as the second fuel supply 152 shown in FIG. 2. For example, the at least one fuel chamber 320 may be configured to receive the second fuel 160 from the second fuel supply 152 via the fuel supply conduit 102. Moreover, the first housing portion 305 may define one or more fuel openings 325 in fluid communication with the at least one fuel chamber 320. The one or more fuel openings 325 may be in fluid communication with the fuel supply conduit 102.

In at least one exemplary embodiment, the first housing portion 305 may be spaced from the second housing portion 310 in the vertical direction V (i.e., in the direction parallel to center axis 510) such that the housing 300 defines an air plenum 315 between the first housing portion 305 and the second housing portion 310. The air plenum 315 may be configured to be in fluid communication with annulus 47 of the combustor 17, shown in FIG. 2. For example, the air plenum 315 may be configured to receive at least a portion of the compressed air 15 via the annulus 47.

Figure 5:
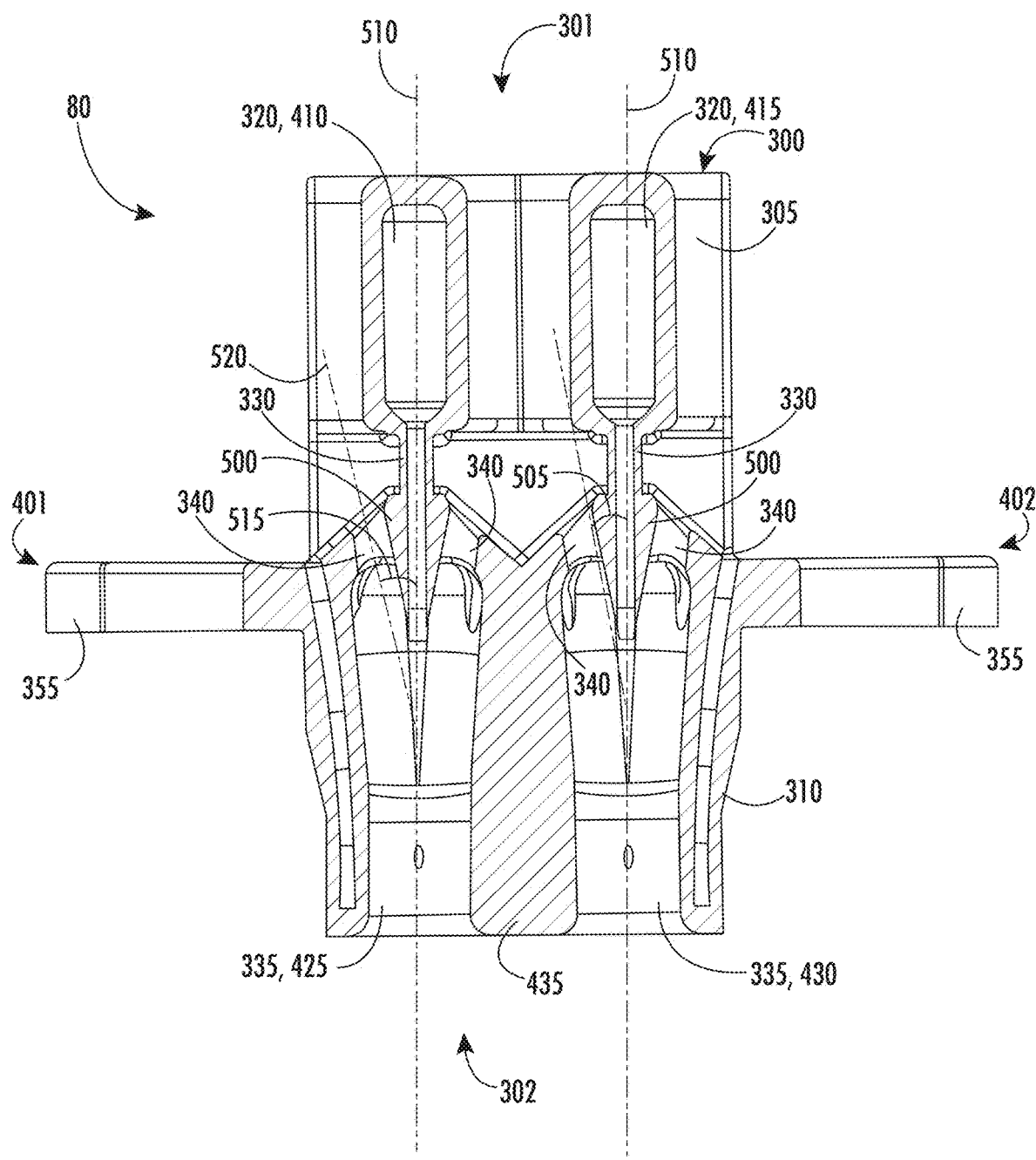
FIG. 5 is a cross-sectional view of the fuel injection assembly of FIG. 3, as taken along line V-V of FIG. 3, in accordance with embodiments of the present disclosure.

As shown in FIGS. 3 and 5, the housing 300 includes a plurality of fuel channels 330 in fluid communication with the at least one fuel chamber 320 and extending between the first housing portion 305 and the second housing portion 310. At least a portion of the air plenum 315 may be defined between the plurality of fuel channels 330. Said differently, the plurality of fuel channels 330 may extend through and be surrounded by the air plenum 315. Moreover, the plurality of fuel channels 330 may be spaced along a length of the housing 300, such as along the longitudinal axis 308, between the third end 303 and the fourth end 304. For example, the plurality of fuel channels 330 may be evenly spaced along the longitudinal axis 308.

In at least one example embodiment, the second housing portion 310 defines at least one mixing chamber 335. The at least one mixing chamber 335 may extend along the longitudinal axis 308 between the third end 303 and the fourth end 304. Additionally, the plurality of fuel channels 330 are in fluid communication with the at least one mixing chamber 335.

The second housing portion 310 also defines a plurality of fluid channels or passageways. For example, the second housing portion 310 defines a first plurality of fluid channels 340, a second plurality of fluid channels 345, and a third plurality of fluid channels 350, as will be described in greater detail with respect to FIGS. 5-8, below. Each of the first plurality of fluid channels 340, the second plurality of fluid channels 345, and the third plurality of fluid channels 350 may be spaced along the length of the housing 300, such as along the longitudinal axis 308, between the third end 303 and the fourth end 304. For example, each of the first plurality of fluid channels 340, the second plurality of fluid channels 345, and the third plurality of fluid channels 350 may be evenly spaced along the longitudinal axis 308.

In at least one exemplary embodiment, the housing 300 of the fuel injection assembly 80 includes one or more mounting structures 355 extending from one or more corners of the housing 300. The one or more mounting structures 355 may be configured to couple the fuel injection assembly 80 to the combustor 17. For example, the one or more mounting structures 355 may couple the fuel injection assembly 80 to the outer sleeve 48 of the combustor 17 (shown in FIG. 2). Additionally, the one or more mounting structures 355 may define one or more openings 360 for receiving one or more fasteners, such as screws or bolts, to secure the fuel injection assembly 80 to the combustor 17.

Figure 4A:
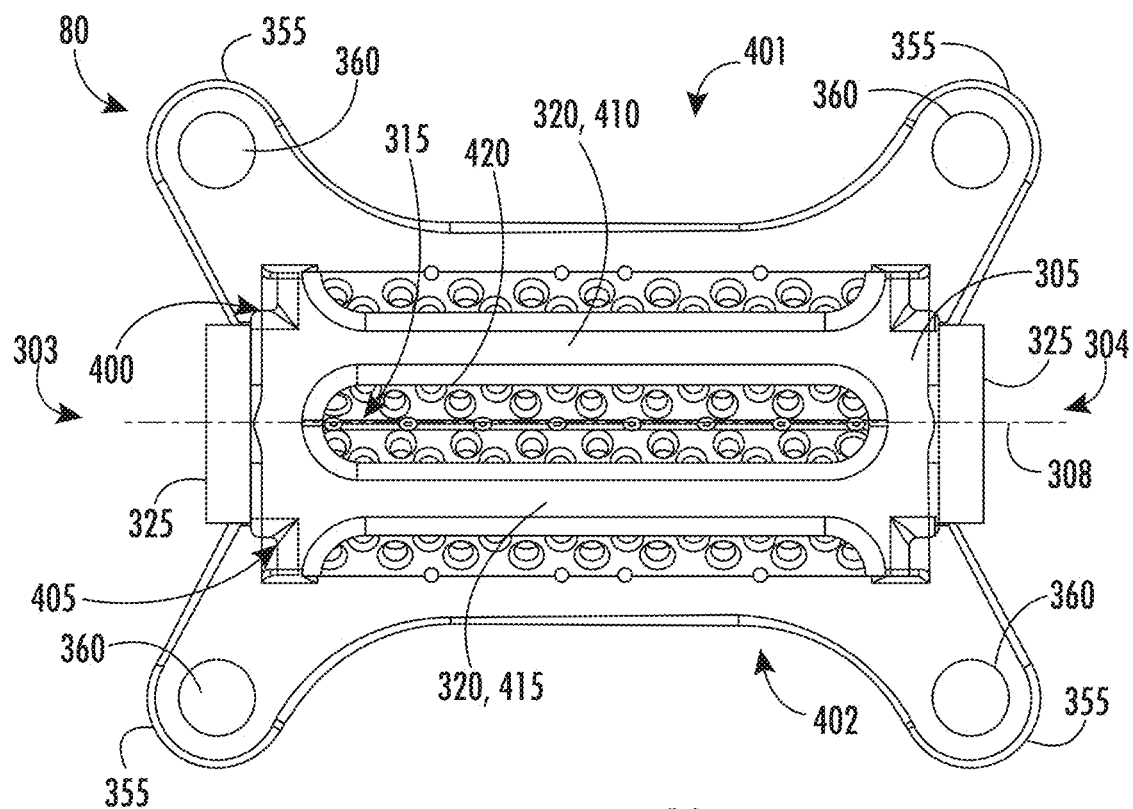
FIG. 4A is a top view of the fuel injection assembly of FIG. 3, in accordance with embodiments of the present disclosure.
Figure 4B:
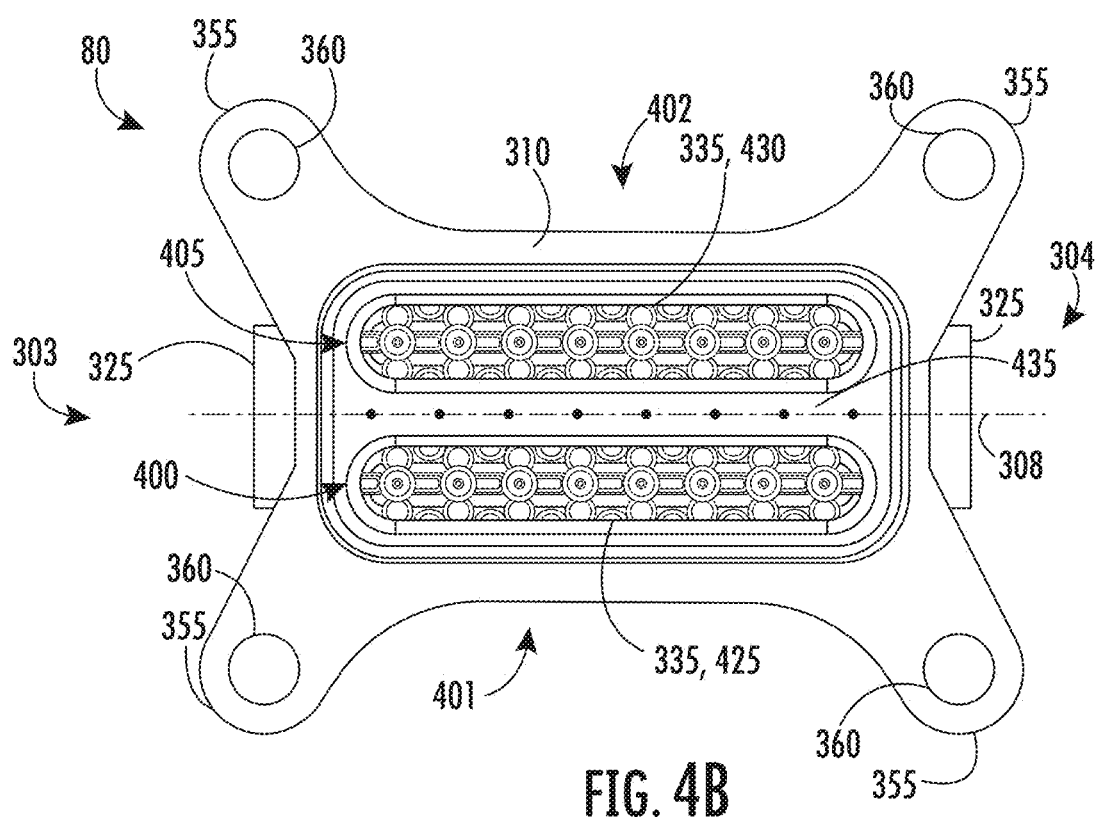
FIG. 4B is a bottom view of the fuel injection assembly of FIG. 3, in accordance with embodiments of the present disclosure.

FIG. 4A illustrates a top view of the fuel injection assembly 80 of FIG. 3, in accordance with embodiments of the present disclosure. FIG. 4B illustrates a bottom view of the fuel injection assembly 80 of FIG. 3, in accordance with embodiments of the present disclosure.

In at least one exemplary embodiment, the fuel injection assembly 80 includes at least one elongated fuel injector. The at least one fuel injector includes the plurality of fuel channels 330, the first plurality of fluid channels 340, the second plurality of fluid channels 345, and the third plurality of fluid channels 350. With reference to FIGS. 4A-4B, the fuel injection assembly 80 may include a first elongated fuel injector 400 and a second elongated fuel injector 405. The first elongated fuel injector 400 and the second elongated fuel injector 405 may extend along the longitudinal axis 308 between the third end 303 and the fourth end 304. Additionally, the first elongated fuel injector 400 may be axially spaced from the second elongated fuel injector 405 (i.e., spaced apart in the transverse direction). For example, the first elongated fuel injector 400 may be adjacent the first side 401, and the second elongated fuel injector 405 may be adjacent the second side.

The first elongated fuel injector 400 may be similar or analogous to the second elongated fuel injector 405. For example, both the first elongated fuel injector 400 and the second elongated fuel injector 405 include the plurality of fuel channels 330, the first plurality of fluid channels 340, the second plurality of fluid channels 345, and the third plurality of fluid channels 350. In some example embodiments, the fuel injection assembly 80 may include three or more elongated fuel injectors. In additional example embodiments, the fuel injection assembly 80 may include one of the elongated fuel injectors, such as shown in FIG. 8.

With reference to FIG. 4A, the at least one fuel chamber 320 may include a first fuel chamber 410 and a second fuel chamber 415. The at least one fuel chamber 320 may also define a slot 420 between the first fuel chamber 410 and the second fuel chamber 415. The slot 420 may be in fluid communication with the air plenum 315.

In at least one example embodiment, the first fuel chamber 410 and the second fuel chamber 415 are fluidly coupled. For example, the first fuel chamber 410 and the second fuel chamber 415 may be fluidly coupled adjacent one or both of the third end 303 and the fourth end 304. Moreover, the first fuel chamber 410 and the second fuel chamber 415 may be fluidly coupled to the one or more fuel openings 325. Additionally, the first fuel chamber 410 may be in fluid communication with the plurality of fuel channels 330 of the first elongated fuel injector 400, and the second fuel chamber 415 may be in fluid communication with the plurality of fuel channels 330 of the second elongated fuel injector 405.

Now referring to FIG. 4B, the at least one mixing chamber 335 of the fuel injection assembly 80 may include a first mixing chamber 425 and a second mixing chamber 430. For example, the first mixing chamber 425 may be associated with the first elongated fuel injector 400 and the second mixing chamber 430 may be associated with the second elongated fuel injector 405. Accordingly, the first mixing chamber 425 may be in fluid communication with the plurality of fuel channels 330, the first plurality of fluid channels 340, the second plurality of fluid channels 345, and the third plurality of fluid channels 350 of the first elongated fuel injector 400, and the second mixing chamber 430 may be in fluid communication with the plurality of fuel channels 330, the first plurality of fluid channels 340, the second plurality of fluid channels 345, and the third plurality of fluid channels 350 of the second elongated fuel injector 405.

In at least one exemplary embodiment, the first mixing chamber 425 is fluidly isolated from the second mixing chamber 430. For example, the second housing portion 310 may include a divider 435 extending along the longitudinal axis 308 between the third end 303 and the fourth end 404 between the first elongated fuel injector 400 and the second elongated fuel injector 405. In other example embodiments, the fuel injection assembly includes a single mixing chamber in fluid communication with the plurality of fuel channels 330, the first plurality of fluid channels 340, the second plurality of fluid channels 345, and the third plurality of fluid channels 350 of both the first elongated fuel injector 400 and the second elongated fuel injector 405.

FIG. 5 illustrates a cross-sectional view of the fuel injection assembly 80 of FIG. 3, taken along line V-V of FIG. 3, in accordance with embodiments of the present disclosure.

In at least one exemplary embodiment, each fuel channel 330 of the plurality of fuel channels 330 includes a fuel outlet nozzle 500 extending at least partially into one of the at least one mixing chamber 335. The fuel outlet nozzle 500 may have a conical shape. For example, a fuel outlet angle 505 may be defined between an exterior surface of the fuel outlet nozzle 500 and a central axis 510 extending along the fuel channel 330 between the first end 301 and the second end 302. The fuel outlet angle 505 may be between about 5° and about 20°. For example, in some embodiments, the fuel outlet angle 505 may be about 10°.

As shown in FIG. 5, the first plurality of fluid channels 340 may be disposed in the second housing portion 310 of the housing 300 at a first fluid channel angle 515. The first fluid channel angle 515 may be defined between a first fluid channel axis 520 extending through a respective fluid channel of the first plurality of fluid channels 340 and the central axis 510. In at least one example embodiment, the first fluid channel angle 515 is equal to the fuel outlet angle 505. For example, the first fluid channel angle 515 may be between about 5° and about 20°. For example, in some embodiments, the first fluid channel angle 515 may be about 10°. In some example embodiments, each fluid channel of the first plurality of fluid channels 340 may have a substantially cylindrical or conical shape.

Figure 6:
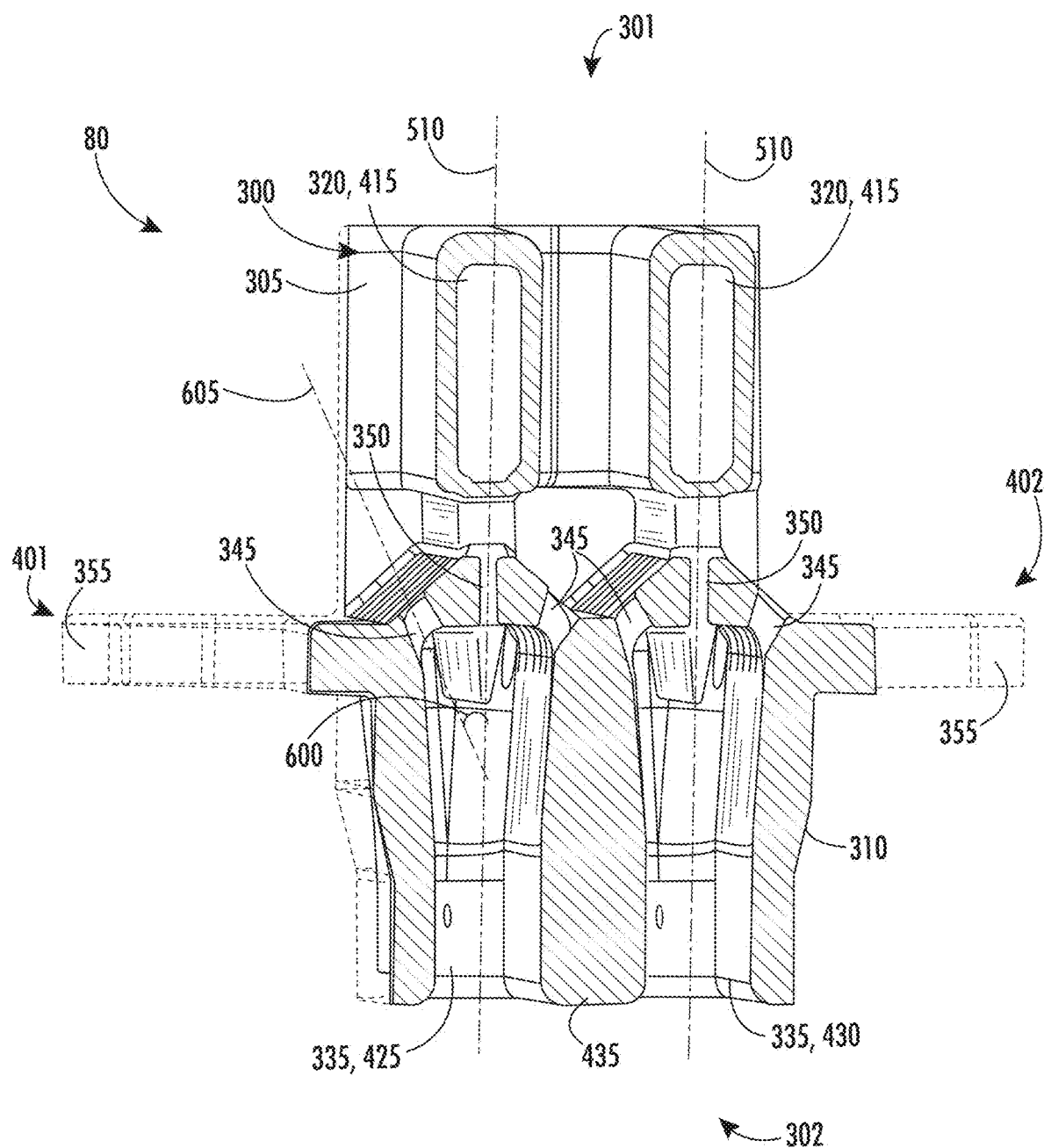
FIG. 6 is a cross-sectional view of the fuel injection assembly of FIG. 3, as taken along line VI-VI of FIG. 3, in accordance with embodiments of the present disclosure.

FIG. 6 illustrates a cross-sectional view of the fuel injection assembly 80 of FIG. 3, taken along line VI-VI of FIG. 3, in accordance with embodiments of the present disclosure.

In at least one exemplary embodiment, each of the second plurality of fluid channels 345 is disposed in the second housing portion 310 of the housing 300 at a second fluid channel angle 600. The second fluid channel angle 600 may be defined between a second fluid channel axis 605 and the central axis 510. The second fluid channel angle 600 may be greater than one or both of the fuel outlet angle 505 and the first fluid channel angle 515. For example, the second fluid channel angle 600 may be between about 15° and about 35°. More particularly, the second fluid channel angle 600 may be about 20°. In some example embodiments, each of the second plurality of fluid channels 345 may have a substantially cylindrical or conical shape.

Moreover, as shown in FIG. 6, the third plurality of fluid channels 350 are disposed in the second housing portion 310 of the housing 300 along the central axis 510. For example, the third plurality of fluid channels 350 extends parallel with the plurality of fuel channels 330. In at least one alternate embodiment, the third plurality of fluid channels 350 may be angled relative to the central axis 510. For example, the third plurality of fluid channels 350 may be angled between about 0° and about 5° relative to the central axis 510. In some example embodiments, the third plurality of fluid channels 350 may have a substantially cylindrical or ovular shape.

Figure 7:
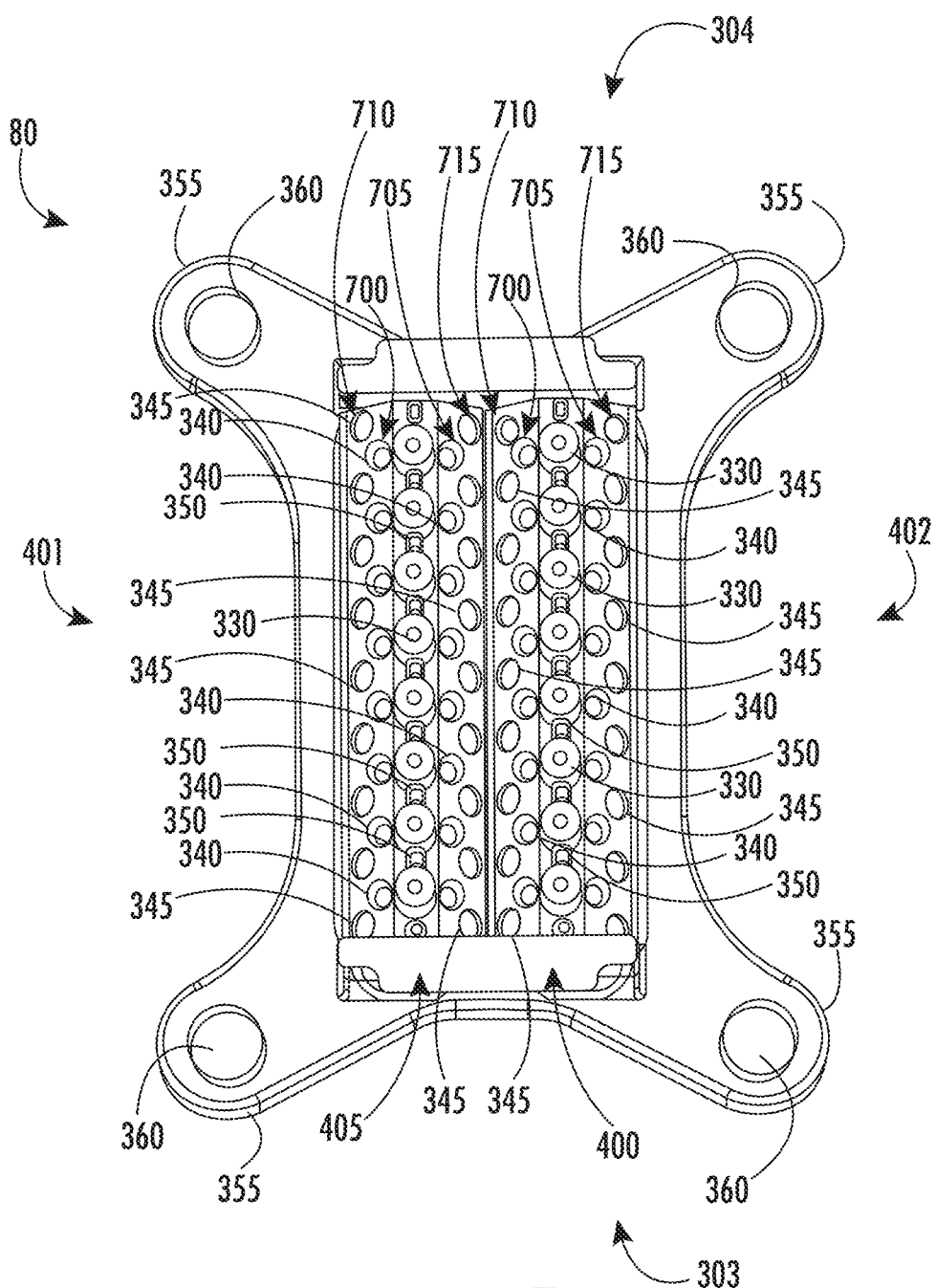
FIG. 7 is a cross-sectional view of the fuel injection assembly of FIG. 3, as taken along line VII-VII of FIG. 3, in accordance with embodiments of the present disclosure.

FIG. 7 illustrates a cross-sectional view of the fuel injection assembly 80 of FIG. 3, taken along line VII-VII of FIG. 3, in accordance with embodiments of the present disclosure.

As discussed above with respect to FIGS. 4A-4B, the fuel injection assembly 80 may include the first elongated fuel injector 400 and the second elongated fuel injector 405. As shown in FIG. 7, the first elongated fuel injector 400 and the second elongated fuel injector 405 include a first row 700 of the first plurality of fluid channels 340 and a second row 705 of the first plurality of fluid channels 340. The first row 700 of the first plurality of fluid channels 340 and the second row 705 of the first plurality of fluid channels 340 are disposed on opposing sides of the plurality of fuel channels 330. For example, the first row 700 of the first plurality of fluid channels 340 and the second row 705 of the first plurality of fluid channels 340 may be disposed on opposing sides of the central axis 510 (FIGS. 5-6) extending through the plurality of fuel channels 330. Additionally, the first plurality of fluid channels 340 in the first row 700 and the second row 705 may be adjacent the plurality of fuel channels 330 such that the first plurality of fluid channels 340 in the first row 700 and the second row 705 are aligned (e.g., in the longitudinal direction) with the plurality of fuel channels 330. In at least one example embodiment, the first plurality of fluid channels 340 in the first row 700 and the second row 705 may be equally spaced between the third end 303 and the fourth end 304.

In at least one exemplary embodiment, the first elongated fuel injector 400 and the second elongated fuel injector 405 also include a first row 710 of the second plurality of fluid channels 345 and a second row 715 of the second plurality of fluid channels 345. The first row 710 of the second plurality of fluid channels 345 and the second row 715 of the second plurality of fluid channels 345 are disposed on opposing sides of the central axis 510 (FIGS. 5-6) extending through the plurality of fuel channels 330. Moreover, the first row 710 of the second plurality of fluid channels 345 and the second row 715 of the second plurality of fluid channels 345 are disposed on opposing sides of the plurality of fuel channels 330 and the first plurality of fluid channels 340. For example, the first row 710 of the second plurality of fluid channels 345 is adjacent the first row 700 of the first plurality of fluid channels 340, and the second row 715 of the second plurality of fluid channels 345 is adjacent the second row 705 of the first plurality of fluid channels 340.

Additionally, as shown in FIG. 7, the first row 710 of the second plurality of fluid channels 345 and the second row 715 of the second plurality of fluid channels 345 are offset (e.g., longitudinally) from the first row 700 of the first plurality of fluid channels 340 and the second row 705 of the first plurality of fluid channels 340. For example, the first plurality of fluid channels 340 in the first row 700 and the second row 705 may be between the second plurality of fluid channels 345 in the first row 710 and the second row 715. In at least one example embodiment, the second plurality of fluid channels 345 in the first row 710 and the second row 715 may be equally spaced between the third end 303 and the fourth end 304.

Still referring to FIG. 7, the third plurality of fluid channels 350 may be disposed in a same row as the plurality of fuel channels 330 extending between the third end 303 and the fourth end 304 of the first elongated fuel injector 400 and the second elongated fuel injector 405. For example, each of the plurality of fuel channels 330 may be disposed between adjacent fluid channels of the third plurality of fluid channels 350. Moreover, the plurality of fuel channels 330 and the third plurality of fluid channels 350 may be equally spaced between the third end 303 and the fourth end 304.

Figure 8A:
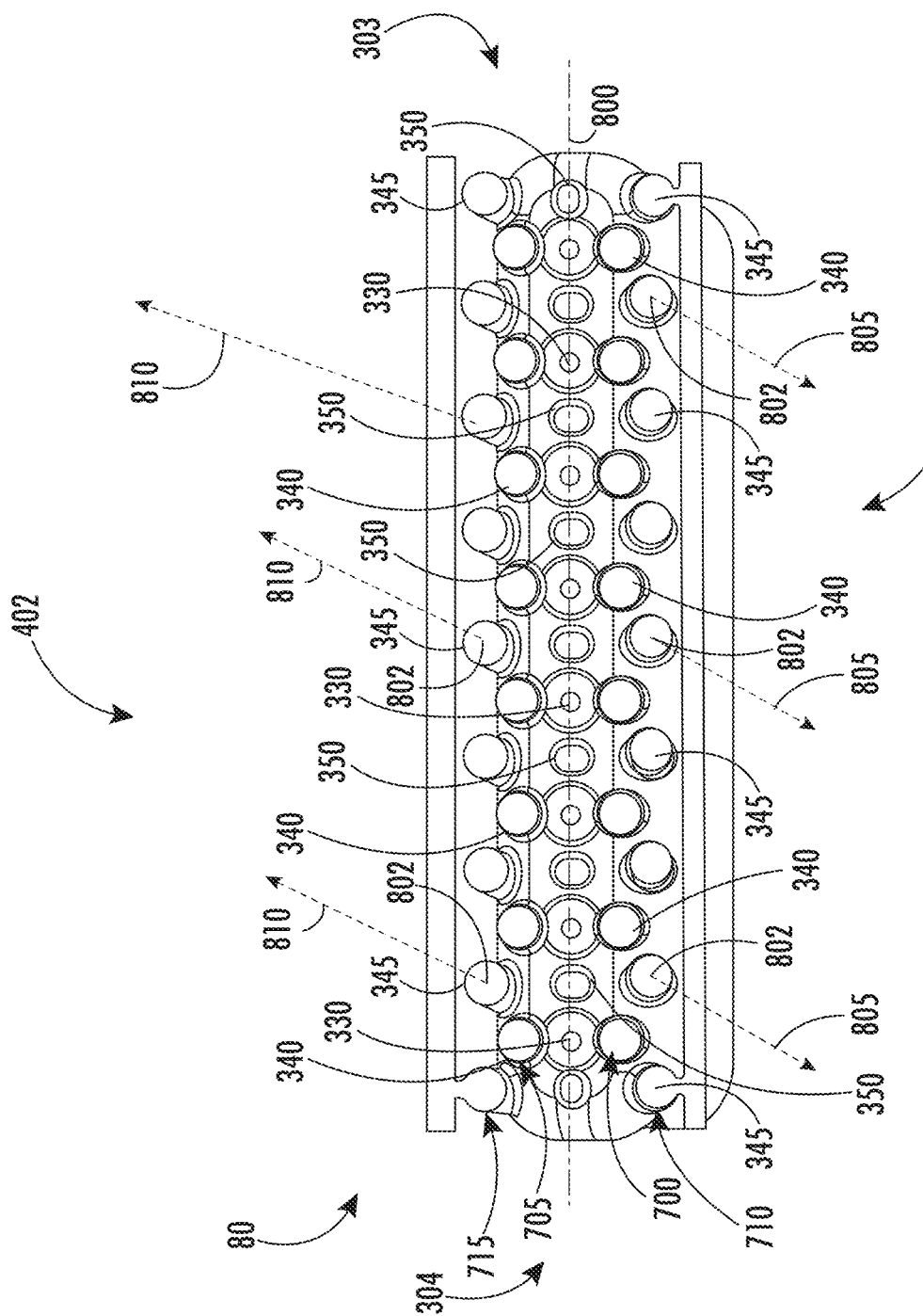
FIG. 8A is a cross-sectional view of the fuel injection assembly of FIG. 3, as taken along line VIII-VIII of FIG. 3, in accordance with embodiments of the present disclosure.
Figure 8B:
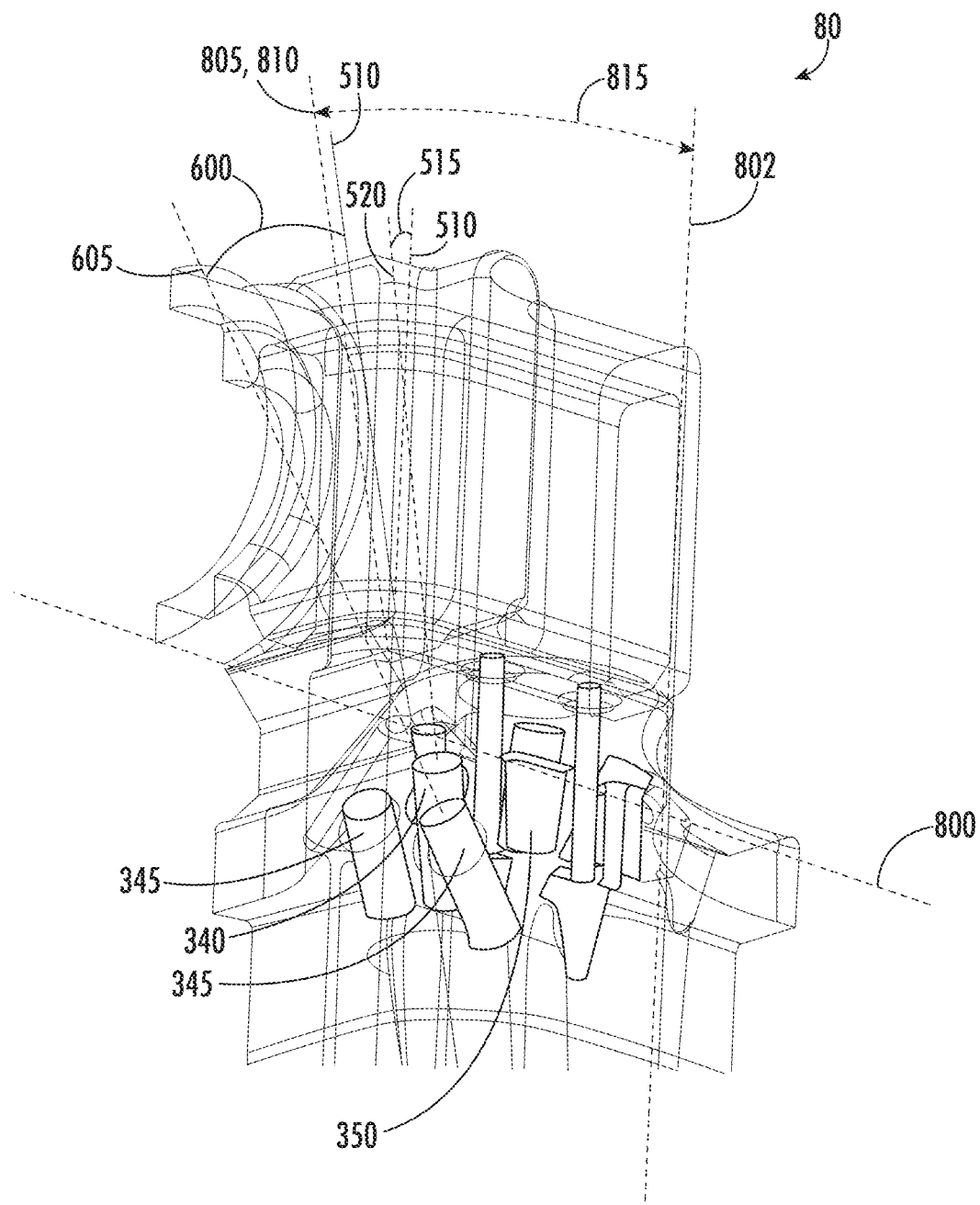
FIG. 8B illustrates a detailed, cross-sectional view of the fuel injection assembly of FIG. 3, in accordance with embodiments of the present disclosure.

FIG. 8A illustrates a cross-sectional view of the fuel injection assembly 80 of FIG. 3, taken along line VIII-VIII of FIG. 3, in accordance with embodiments of the present disclosure. FIG. 8B illustrates a detailed, cross-section view of the fuel injection assembly 80 of FIG. 3, in accordance with embodiments of the present disclosure.

In at least one exemplary embodiment, a longitudinal axis 800 extends along the fuel injection assembly 80 between the third end 303 and the fourth end 304. For example, the longitudinal axis 800 may extend through the centers of the plurality of fuel channels 330 between the third end 303 and the fourth end 304. Moreover, although only one elongated fuel injector of the fuel injection assembly 80 is shown in FIG. 8A, the fuel injection assembly 80 may include two or more elongated fuel injectors, such as the first elongated fuel injector 400 and the second elongated fuel injector 405, discussed above.

In at least one example embodiment, the second plurality of fluid channels 345 are angled in a secondary direction along the longitudinal axis 800 relative to a vertical axis 802 perpendicular to the longitudinal axis 800. The vertical axis 802 may also extend through each of the second plurality of fluid channels 345 parallel to the central axis 510. For example, the second plurality of fluid channels 345 in the first row 710 may be angled in a first direction, indicated by first direction arrows 805, and the second plurality of fluid channels 345 in the second row 715 may be angled in a second direction, indicated by second direction arrows 810. As shown in FIG. 8A, the first direction may be generally opposite the second direction. For example, the first direction arrows 805 may extend towards the fourth end 304, and the second direction arrows 810 may extend towards the third end 303. In other example embodiments, the first direction arrows 805 may extend towards the third end 303, and the second direction arrows 810 may extend towards the fourth end 304.

Moreover, as shown in FIG. 8B, a secondary direction angle 815 may be defined between the vertical axis 802 and each of the first direction arrows 805 and the second direction arrows 810. For example, the second plurality of fluid channels 345 in the first row 710 and the second row 715 may define the secondary direction angle 815 relative to the vertical axis 802. In at least one example embodiment, the secondary direction angle 815 is between about 0° to about 25° relative to the vertical axis 802. For example, the secondary direction angle 815 may be about 12° in some particular embodiments. More particularly, the secondary direction angle 815 may be about 12.2° relative to the vertical axis 802 in some example embodiments.

In operation, the at least one fuel chamber 320 of the fuel injection assembly 80 is configured to receive fuel, such as the second fuel 160 from the second fuel supply 152. The second fuel 160 is delivered to the at least one mixing chamber 335 from the at least one fuel chamber 320 via the plurality of fuel channels 330 and the fuel outlet nozzle 500. Additionally, air, such as the compressed air 15, is introduced into the at least one mixing chamber 335 via the first plurality of fluid channels 340, the second plurality of fluid channels 345, and the third plurality of fluid channels 350 and creates a vortex structure for enhancing mixing of the fuel and the air. For example, the compressed air 15 is introduced into the at least one mixing chamber 335 via the first plurality of fluid channels 340 at the first fluid channel angle 515 and via the second plurality of fluid channels 345 at the second fluid channel angle 600, as discussed above with respect to FIGS. 5-6. Additionally, as discussed above with respect to FIGS. 8A-8B, the compressed air 15 is also delivered to the at least one mixing chamber 335 via the second plurality of fluid channels 345 at the secondary angle. For example, the compressed air 15 enters the at least one mixing chamber 335 via the second plurality of fluid channels 345 in the first row 710 in the first direction 805 and via the second plurality of fluid channels 345 in the second row 715 in the second direction 810.

In at least one example embodiment, the angle at which the compressed air 15 enters the at least one mixing chamber 335 via the second plurality of fluid channels 345 is greater the angle at which the compressed air 15 enters the at least one mixing chamber 335 via the first plurality of fluid channels 340. Accordingly, a first portion of the compressed air 15 entering the at least one mixing chamber 335 via the second plurality of fluid channels 345 intersects a second portion of the compressed air 15 entering via the first plurality of fluid channels 340. The first portion of the compressed air 15 moves inward towards the central axis 510 extending through the plurality of fuel channels 330, and the second portion of the air and at least a portion of the fuel is pushed outward away from the central axis 510. Accordingly, a plurality of double vortexes is formed within the at least one mixing chamber 335 that promotes mixing of the air and the fuel to form the air-fuel mixture within the at least one mixing chamber 335. The air-fuel mixture may be injected from the at least one mixing chamber into the secondary combustion zone 74 of the combustor 17. Such a configuration reduces the likelihood of flashback and flame holding, when burning highly reactive fuels (such as hydrogen) or fuel mixtures containing a majority of hydrogen. Additionally, the improved mixing achieved by the fuel injection assembly 80 promotes completion combustion of the fuel, thereby reducing the formation of undesirable emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A fuel injection assembly for a combustor of a gas turbine engine, comprising: a housing extending between a first end and a second end opposite the first end, the housing including a first housing portion adjacent the first end, a second housing portion adjacent the second end, wherein the first housing portion defines at least one fuel chamber and the second housing portion defines at least one mixing chamber; a plurality of fuel channels extending along a central axis between the first housing portion and the second housing portion, the plurality of fuel channels in fluid communication with the at least one fuel chamber and the at least one mixing chamber, the plurality of fuel channels spaced apart along a length of the housing; a first plurality of fluid channels disposed in the second housing portion and in fluid communication with the at least one mixing chamber, the first plurality of fluid channels spaced from the plurality of fuel channels; and a second plurality of fluid channels disposed in the second housing portion and in fluid communication with the at least one mixing chamber, the second plurality of fluid channels spaced from the first plurality of fluid channels.

The fuel injection assembly of one or more of these clauses, wherein the second plurality of fluid channels is offset in a longitudinal direction from the first plurality of fluid channels.

The fuel injection assembly of one or more of these clauses, further comprising: a third plurality of fluid channels disposed in the second housing portion and in fluid communication with the at least one mixing chamber; wherein the third plurality of fluid channels are spaced apart along the length of the housing; and wherein each fuel channel of the plurality of fuel channels is disposed between adjacent fluid channels of the third plurality of fluid channels.

The fuel injection assembly of one or more of these clauses, wherein the plurality of fuel channels includes a fuel outlet nozzle extending into the at least one mixing chamber.

The fuel injection assembly of one or more of these clauses, wherein: the fuel outlet nozzle comprises a conical shape; an exterior surface of the fuel outlet nozzle defines a fuel outlet angle relative to the central axis; and the fuel outlet angle is about 10°.

The fuel injection assembly of one or more of these clauses, wherein: each fluid channel of the first plurality of fluid channels defines a first fluid channel angle relative to the central axis and a first axis extending through a respective fluid channel of the first plurality of fluid channels; each fluid channel of the second plurality of fluid channels defines a second fluid channel angle relative to the central axis and a second axis extending through a respective fluid channel of the second plurality of fluid channels; and the second fluid channel angle is greater than the first fluid channel angle.

The fuel injection assembly of one or more of these clauses, wherein: the first fluid channel angle is about 10°; the second fluid channel angle is about 20°; the second plurality of fluid channels defines a secondary direction angle relative to a vertical axis extending through each of the second plurality of fluid channels parallel to the central axis; and the secondary direction angle is about 12°.

The fuel injection assembly of one or more of these clauses, wherein: the first plurality of fluid channels includes a first row of first fluid channels and a second row of first fluid channels, the first row of first fluid channels and the second row of first fluid channels disposed on opposing sides of the central axis; and the second plurality of fluid channels includes a first row of second fluid channels and a second row of second fluid channels, the first row of second fluid channels and the second row of second fluid channels disposed on opposing sides of the central axis.

The fuel injection assembly of one or more of these clauses, wherein: the first row of second fluid channels is angled in a first direction; the second row of second fluid channels is angled in a second direction; and the first direction is opposite the second direction.

The fuel injection assembly of one or more of these clauses, wherein the first row of first fluid channels and the second row of first fluid channels are aligned longitudinally with the plurality of fuel channels.

The fuel injection assembly of one or more of these clauses, wherein: the plurality of fuel channels, the first plurality of fluid channels, and the second plurality of fluid channels comprise an elongated fuel injector; and the fuel injection assembly comprises two or more of the elongated fuel injectors.

A combustor comprising: a combustion liner extending in a downstream direction and defining a combustion chamber; an outer sleeve spaced apart from and surrounding the combustion liner such that an annulus is defined between the outer sleeve and the combustion liner; and a fuel injection assembly coupled to the outer sleeve and in fluid communication with a fuel source, the fuel injection assembly comprising: a housing extending between a first end and a second end opposite the first end, the housing including a first housing portion adjacent the first end, a second housing portion adjacent the second end, wherein the first housing portion defines at least one fuel chamber and the second housing portion defines at least one mixing chamber, a plurality of fuel channels extending along a central axis between the first housing portion and the second housing portion, the plurality of fuel channels in fluid communication with the at least one fuel chamber and the at least one mixing chamber, the plurality of fuel channels spaced apart along a length of the housing, a first plurality of fluid channels disposed in the second housing portion and in fluid communication with the at least one mixing chamber, the first plurality of fluid channels spaced from the plurality of fuel channels, and a second plurality of fluid channels disposed in the second housing portion and in fluid communication with the at least one mixing chamber, the second plurality of fluid channels spaced from the first plurality of fluid channels.

The combustor of one or more of these clauses, wherein the at least one fuel chamber is in fluid communication with the fuel source via a fuel supply conduit; wherein the fuel source supplies a fuel containing pure hydrogen or a fuel mixture of hydrogen and natural gas, where hydrogen is a majority component of the fuel mixture.

The combustor of one or more of these clauses, wherein: the housing defines an air plenum between the first housing portion and the second housing portion; at least a portion of the plurality of fuel channels extends through the air plenum; and the first plurality of fluid channels and the second plurality of fluid channels are in fluid communication with the air plenum.

The combustor of one or more of these clauses, wherein the air plenum is in fluid communication with the annulus.

The combustor of one or more of these clauses, further comprising: a third plurality of fluid channels disposed in the second housing portion and in fluid communication with the at least one mixing chamber; wherein the third plurality of fluid channels are spaced apart along the length of the housing; and wherein each fuel channel of the plurality of fuel channels is disposed between adjacent fluid channels of the third plurality of fluid channels.

The combustor of one or more of these clauses, wherein: each of the first plurality of fluid channels defines a first fluid channel angle relative to the central axis and a first axis extending through a respective fluid channel of the first plurality of fluid channels; each of the second plurality of fluid channels defines a second fluid channel angle relative to the central axis and a second axis extending through a respective fluid channel of the second plurality of fluid channels; and the second fluid channel angle is greater than the first fluid channel angle.

The combustor of one or more of these clauses, wherein: the first fluid channel angle is about 10°; the second fluid channel angle is about 20°; the second plurality of fluid channels defines a secondary direction angle relative to a vertical axis extending through each of the second plurality of fluid channels parallel to the central axis; and the secondary direction angle is about 12°.

The combustor of one or more of these clauses, wherein: the first plurality of fluid channels includes a first row of first fluid channels and a second row of first fluid channels, the second row of fluid channels disposed on opposing side of the central axis; and the second plurality of fluid channels includes a first row of second fluid channels and a second row of second fluid channels, the first row of second fluid channels and the second row of second fluid channels disposed on opposing sides of the central axis.

The combustor of one or more of these clauses, wherein: the first row of second fluid channels is angled in a first direction; the second row of second fluid channels is angled in a second direction; and the first direction is opposite the second direction.

What is claimed is:

1. A fuel injection assembly for a combustor of a gas turbine engine, comprising:
   a housing extending between a first end and a second end opposite the first end, the housing including a first housing portion adjacent the first end, a second housing portion adjacent the second end, wherein the first housing portion defines at least one fuel chamber and the second housing portion defines at least one mixing chamber;
   a plurality of fuel channels extending along a central axis between the first housing portion and the second housing portion, the plurality of fuel channels in fluid communication with the at least one fuel chamber and the at least one mixing chamber, the plurality of fuel channels spaced apart along a length of the housing;
   a first plurality of fluid channels disposed in the second housing portion and in fluid communication with the at least one mixing chamber, the first plurality of fluid channels spaced from the plurality of fuel channels, wherein each of the first plurality of fluid channels defines a first fluid channel angle relative to the central axis and a first axis extending through a respective fluid channel of the first plurality of fluid channels; and
   a second plurality of fluid channels disposed in the second housing portion and in fluid communication with the at least one mixing chamber, the second plurality of fluid channels spaced from the first plurality of fluid channels, wherein each of the second plurality of fluid channels defines a second fluid channel angle relative to the central axis and a second axis extending through a respective fluid channel of the second plurality of fluid channels, and wherein the second fluid channel angle is greater than the first fluid channel angle.

2. The fuel injection assembly of claim 1, wherein the second plurality of fluid channels is offset in a longitudinal direction from the first plurality of fluid channels.

3. The fuel injection assembly of claim 1, further comprising:
   a third plurality of fluid channels disposed in the second housing portion and in fluid communication with the at least one mixing chamber;
   wherein the third plurality of fluid channels is spaced apart along the length of the housing; and
   wherein each fuel channel of the plurality of fuel channels is disposed between adjacent fluid channels of the third plurality of fluid channels.

4. The fuel injection assembly of claim 1, wherein the plurality of fuel channels includes a fuel outlet nozzle extending into the at least one mixing chamber.

5. The fuel injection assembly of claim 4, wherein:
   the fuel outlet nozzle comprises a conical shape;
   an exterior surface of the fuel outlet nozzle defines a fuel outlet angle relative to the central axis; and
   the fuel outlet angle is about 10°.

6. The fuel injection assembly of claim 1, wherein:
   the first fluid channel angle is about 10°;
   the second fluid channel angle is about 20°;
   the second plurality of fluid channels define a secondary direction angle relative to a vertical axis extending through each of the second plurality of fluid channels parallel to the central axis; and
   the secondary direction angle is about 12°.

7. The fuel injection assembly of claim 1, wherein:
   the first plurality of fluid channels includes a first row of first fluid channels and a second row of first fluid channels, the first row of first fluid channels and the second row of first fluid channels disposed on opposing sides of the central axis; and
   the second plurality of fluid channels includes a first row of second fluid channels and a second row of second fluid channels, the first row of second fluid channels and the second row of second fluid channels disposed on opposing sides of the central axis.

8. The fuel injection assembly of claim 7, wherein:
   the first row of second fluid channels is angled in a first direction;
   the second row of second fluid channels is angled in a second direction; and
   the first direction is opposite the second direction.

9. The fuel injection assembly of claim 7, wherein the first row of first fluid channels and the second row of first fluid channels are aligned longitudinally with the plurality of fuel channels.

10. The fuel injection assembly of claim 1, wherein:
the plurality of fuel channels, the first plurality of fluid channels, and the second plurality of fluid channels comprise an elongated fuel injector; and
the fuel injection assembly comprises two or more of the elongated fuel injectors.

11. A combustor comprising:
a combustion liner extending in a downstream direction and defining a combustion chamber;
an outer sleeve spaced apart from and surrounding the combustion liner such that an annulus is defined between the outer sleeve and the combustion liner; and
a fuel injection assembly coupled to and at least partially radially outward of the outer sleeve and in fluid communication with a fuel source, the fuel injection assembly comprising:
  a housing extending between a first end and a second end opposite the first end, the housing including a first housing portion adjacent the first end, a second housing portion adjacent the second end, wherein the first housing portion defines at least one fuel chamber and the second housing portion defines at least one mixing chamber,
  a plurality of fuel channels extending along a central axis between the first housing portion and the second housing portion, the plurality of fuel channels in fluid communication with the at least one fuel chamber and the at least one mixing chamber, the plurality of fuel channels spaced apart along a length of the housing,
  a first plurality of fluid channels disposed in the second housing portion and in fluid communication with the at least one mixing chamber, the first plurality of fluid channels spaced from the plurality of fuel channels, and
  a second plurality of fluid channels disposed in the second housing portion and in fluid communication with the at least one mixing chamber, the second plurality of fluid channels spaced from the first plurality of fluid channels.

12. The combustor of claim 11, wherein the at least one fuel chamber is in fluid communication with the fuel source via a fuel supply conduit; wherein the fuel source supplies a fuel containing pure hydrogen or a fuel mixture of hydrogen and natural gas, where hydrogen is a majority component of the fuel mixture.

13. The combustor of claim 11, wherein:
the housing defines an air plenum between the first housing portion and the second housing portion;
at least a portion of the plurality of fuel channels extend through the air plenum; and
the first plurality of fluid channels and the second plurality of fluid channels are in fluid communication with the air plenum.

14. The combustor of claim 13, wherein the air plenum is in fluid communication with the annulus.

15. The combustor of claim 11, further comprising:
a third plurality of fluid channels disposed in the second housing portion and in fluid communication with the at least one mixing chamber;
wherein the third plurality of fluid channels are spaced apart along the length of the housing; and
wherein each fuel channel of the plurality of fuel channels is disposed between adjacent fluid channels of the third plurality of fluid channels.

16. The combustor of claim 11, wherein:
each of the first plurality of fluid channels defines a first fluid channel angle relative to the central axis and a first axis extending through a respective fluid channel of the first plurality of fluid channels;
each of the second plurality of fluid channels defines a second fluid channel angle relative to the central axis and a second axis extending through a respective fluid channel of the second plurality of fluid channels; and
the second fluid channel angle is greater than the first fluid channel angle.

17. The combustor of claim 16, wherein:
the first fluid channel angle is about 10°;
the second fluid channel angle is about 20°;
the second plurality of fluid channels define a secondary direction angle relative to a vertical axis extending through each of the second plurality of fluid channels parallel to the central axis; and
the secondary direction angle is about 12°.

18. The combustor of claim 11, wherein:
the first plurality of fluid channels includes a first row of first fluid channels and a second row of first fluid channels, the second row of fluid channels disposed on opposing side of the central axis; and
the second plurality of fluid channels includes a first row of second fluid channels and a second row of second fluid channels, the first row of second fluid channels and the second row of second fluid channels disposed on opposing sides of the central axis.

19. The combustor of claim 18, wherein:
the first row of second fluid channels is angled in a first direction;
the second row of second fluid channels is angled in a second direction; and
the first direction is opposite the second direction.

* * * * *